(12) United States Patent
Zhang et al.

(10) Patent No.: US 12,377,861 B2
(45) Date of Patent: Aug. 5, 2025

(54) METHOD AND SYSTEM FOR VEHICLE SIDESLIP ANGLE ESTIMATION BASED ON EVENT-TRIGGERED STATE ESTIMATION

(71) Applicant: BEIJING INSTITUTE OF TECHNOLOGY, Beijing (CN)

(72) Inventors: Lei Zhang, Beijing (CN); Zhenpo Wang, Beijing (CN); Xiaolin Ding, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 167 days.

(21) Appl. No.: 18/015,020

(22) PCT Filed: Jun. 1, 2021

(86) PCT No.: PCT/CN2021/097607
§ 371 (c)(1),
(2) Date: Jan. 6, 2023

(87) PCT Pub. No.: WO2022/166046
PCT Pub. Date: Aug. 11, 2022

(65) Prior Publication Data
US 2023/0264700 A1     Aug. 24, 2023

(30) Foreign Application Priority Data

Feb. 5, 2021 (CN) .......................... 202110167355.X (51) Int. Cl.
*B60W 40/12*     (2012.01)
*B60W 50/00*     (2006.01)

(52) U.S. Cl.
CPC ............ *B60W 40/12* (2013.01); *B60W 50/00* (2013.01); *B60W 2050/0031* (2013.01);
(Continued)

(58) Field of Classification Search
CPC ..................................................... B60W 40/12
See application file for complete search history.

(56) References Cited

U.S. PATENT DOCUMENTS

| | | | |
|---|---|---|---|
| 7,020,552 B2 * | 3/2006 | Park ...................... | B60W 30/04 |
| | | | 280/5.506 |
| 9,285,485 B2 * | 3/2016 | O'Dea .................... | G01S 19/52 |

(Continued)

*Primary Examiner* — Michael A Berns
(74) *Attorney, Agent, or Firm* — Tutunjian & Bitetto, P.C.

(57) ABSTRACT

A method and a system for vehicle sideslip angle estimation based on event-triggered state estimation are provided. The method includes: setting an observation variable, and adopting a Kalman filtering algorithm for iteration aiming at estimation of a vehicle yaw rate; in the iteration, setting a parameter to 1, indicating that an event is triggered, when a calculation of the observation variable satisfies a predetermined condition, otherwise setting the parameter to 0, indicating that the event is not triggered; when the parameter is set and a GPS heading angle is updated, estimating a state variable according to a formula, and calculating a vehicle sideslip angle according to the vehicle yaw rate obtained by adopting the Kalman filtering algorithm; and when the parameter is 1 and the GPS heading angle is not updated yet, estimating the vehicle sideslip angle by fusing measurement data of both a GPS and an IMU.

12 Claims, 4 Drawing Sheets

(52) U.S. Cl.
CPC . *B60W 2050/0052* (2013.01); *B60W 2520/12* (2013.01); *B60W 2520/14* (2013.01)

(56) References Cited

U.S. PATENT DOCUMENTS

| | | | | |
|---|---|---|---|---|
| 12,130,626 B2 | * | 10/2024 | Yu | G05D 1/0212 |
| 2023/0264700 A1 | * | 8/2023 | Zhang | B60W 40/12 |
| | | | | 701/41 |
| 2024/0157957 A1 | * | 5/2024 | Hansson | G06N 7/01 |

* cited by examiner

System for vehicle sideslip angle estimation based on event-triggered state estimation Kalman filtering module 501

Event-triggered distinguishing module 502

Data fusion module 503

FIG. 5

METHOD AND SYSTEM FOR VEHICLE SIDESLIP ANGLE ESTIMATION BASED ON EVENT-TRIGGERED STATE ESTIMATION

CROSS REFERENCE TO RELATED APPLICATION(S)

The present disclosure claims priority of the Chinese patent application No. 202110167355.X, titled "METHOD AND SYSTEM FOR VEHICLE SIDESLIP ANGLE ESTIMATION BASED ON EVENT-TRIGGERED STATE ESTIMATION" and filed to National Intellectual Property Administration of PRC (CNIPA) on Feb. 5, 2021, which is entirely incorporated herein by reference.

TECHNICAL FIELD

The present disclosure relates to the technical field of vehicle sideslip angle estimation, and in particular to a method and a system for vehicle sideslip angle estimation based on event-triggered state estimation.

BACKGROUND ART

Vehicle sideslip angle, as an important state variable to characterize vehicle yaw stability, is mainly used for evaluating vehicle yaw stability and design of a stability control system. In the prior art, the vehicle sideslip angle is usually determined on the basis of vehicle parameter signals measured by multiple sensors and a vehicle dynamics model. Such methods have accuracy depending on the dynamics model, and have low robustness to the model parameter variation.

Besides, there is no method in the prior art yet for vehicle sideslip angle estimation based on event-triggered state estimation.

SUMMARY

The present disclosure aims at providing a method and a system for vehicle sideslip angle estimation based on event-triggered state estimation.

To achieve the above purpose, the present disclosure provides the following scheme.

A method for vehicle sideslip angle estimation based on event-triggered state estimation is provided, including:

setting $z_{k+1} = [\hat{x}_k + \omega_z^{IMU} \cdot T; \omega_z^{IMU}]$ as an observation variable, and adopting a Kalman filtering algorithm for iteration aiming at estimation of vehicle yaw rate, where $\omega_z^{IMU}$ is a vehicle yaw rate measured by Inertial Measurement Unit (IMU), T is a sampling cycle, $\hat{x}_k$ is an estimated state variable obtained in a $k^{th}$ iteration of the Kalman filtering algorithm.

In the iteration:

when $(z_k - z_{\tau_{k-1}})^T (z_k - z_{\tau_{k-1}}) < \delta$, $\varepsilon_k$ is set to 1, otherwise $\varepsilon_k$ is set to 0, where $\delta$ is a preset threshold value;

when $\varepsilon_k$ is 0, the state variable is estimated according to $\hat{x}_{k+1} = \hat{x}_{k+1|k} + (1 - \varepsilon_{k+1}) K_{k+1} (z_{k+1} - \hat{z}_{k+1|k}) + \varepsilon_{k+1} M_{k+1} (z_{\tau_k} - \hat{z}_{k+1|k})$, and a vehicle sideslip angle is calculated according to the vehicle yaw rate obtained by the Kalman filtering algorithm, where $$z_{\tau_k} = [\gamma_{GPS}; \omega_z^{IMU}],$$

$$M_{k+1} = \eta_1 P_{k+1|k}^T H^T (\eta_1 H P_{k+1|k} H^T + \eta_2 R_{k+1} + \eta_3 \delta I)^{-1},$$

-continued $$\begin{cases} \eta_1 = 1 + \tau_1 \\ \eta_2 = 1 + \tau_2 \\ \eta_3 = 1 + \dfrac{1}{\tau_1} + \dfrac{1}{\tau_2} \end{cases},$$

$$\tau_k = \begin{cases} \tau_{k-1}, & \text{if } \varepsilon_k = 1 \\ k, & \text{if } \varepsilon_k = 0 \end{cases},$$

and $K_{k+1} = \dfrac{P_{k+1|k} H'}{H P_{k+1|k} H' + R}$, $\gamma_{GPS}$ is a heading angle measured by Global Positioning System (GPS), H is an observation matrix $P_{k+1|k} = A P_k A' + Q$, A is a state-transition matrix, A' is a rank transformation of the state-transition matrix, H' is a rank transformation of the observation matrix, Q is a system noise covariance, $P_k$ is an error covariance, R is an observation noise covariance, I is a unit matrix, $\tau_1$ is a first predefined parameter, and $\tau_2$ is a second predefined parameter;

when $\varepsilon_k$ is 1, it is determined whether a GPS heading angle is updated; and when the GPS heading angle is updated, the state variable is estimated according to $\hat{x}_{k+1} = \hat{x}_{k+1|k} + (1 - \varepsilon_{k+1}) K_{k+1} (z_{k+1} - \hat{z}_{k+1|k}) + \varepsilon_{k+1} M_{k+1} (z_{\tau_k} - \hat{z}_{k+1|k})$ and the vehicle sideslip angle is calculated according to the vehicle yaw rate obtained by the Kalman filtering algorithm; and when the GPS heading angle is not updated yet, the iteration is terminated, and the vehicle sideslip angle is estimated by fusing measurement data of both GPS and IMU.

In some embodiments, the calculation of the vehicle sideslip angle according to the vehicle yaw rate obtained by the Kalman filtering algorithm specifically includes:

calculating the vehicle yaw angle according to the vehicle yaw rate; and calculating the vehicle sideslip angle according to $\beta = \psi - \gamma_{GPS}$, where $\psi$ is the vehicle yaw angle, and $\gamma_{GPS}$ is the GPS heading angle.

In some embodiments, the estimation of the vehicle sideslip angle by fusing measurement data of both GPS and IMU specifically includes:

determining a longitudinal speed and a lateral speed of the vehicle based on a kinematics model of the vehicle and the vehicle yaw rate, a longitudinal acceleration and a lateral acceleration measured by IMU, and recording the longitudinal speed and the lateral speed as a first longitudinal speed and a first lateral speed;

determining a longitudinal speed and a lateral speed of the vehicle based on the vehicle speed measured by GPS and recording the longitudinal speed and the lateral speed of the vehicle as the second longitudinal speed and the second lateral speed;

fusing the first longitudinal speed and the second longitudinal speed, and fusing the first lateral speed and the second lateral speed by the Kalman filtering algorithm; and calculating the vehicle sideslip angle according to the fused longitudinal speed and lateral speed.

In some embodiments, the determining of the longitudinal speed and the lateral speed of the vehicle based on the vehicle speed measured by GPS specifically includes:

calculating the longitudinal speed $v_x$ and the lateral speed $v_y$ of the vehicle according to $$\begin{cases} v_{x,k+1} = \cos \beta_k \cdot v_{GPS,k+1} \\ v_{y,k+1} = \sin \beta_k \cdot v_{GPS,k+1} \end{cases},$$

where $v_{GPS}$ is the vehicle speed measured by GPS, $\beta$ is the vehicle sideslip angle, and k is a number of iterations.

In some embodiments, the method further includes: correcting the lateral acceleration measured by the IMU; where, the lateral acceleration adopted when determining the longitudinal speed and lateral speed of the vehicle is the corrected lateral acceleration.

The present disclosure further provides a system for vehicle sideslip angle estimation based on event-triggered state estimation, including:

a Kalman filtering module, configured to set $z_{k+1}=[\hat{x}_k+ \omega_z^{IMU} \cdot T; \omega_z^{IMU}]$ as an observation variable, adopt a Kalman filtering algorithm for iteration aiming at estimation of vehicle yaw rate, where $\omega_z^{IMU}$ is a vehicle yaw rate measured by Inertial Measurement Unit (IMU), T is a sampling cycle, and $\hat{x}_k$ is an estimated state variable obtained in the $k^{th}$ iteration of the Kalman filtering algorithm;

an event-triggered distinguishing module, configured to set $\varepsilon_k$ to 1 when $(z_k-z_{\tau_{k-1}})^T(z_k-z_{\tau_{k-1}})<\delta$ in an iteration, otherwise set $\varepsilon_k$ to 0; where $\delta$ is a preset threshold value; and a data fusion module, configured to estimate the vehicle sideslip angle by fusing measurement data of both Global Positioning Unit (GPS) and IMU when $\varepsilon_k$ is 1 and a GPS heading angle is not updated yet.

The Kalman filtering module is also configured to estimate the state variable according to $\hat{x}^{k+1}=\hat{x}_{k+1|k}+(1-\varepsilon_{k+1})K_{k+1}(z_{k+1}-\hat{z}_{k+1|k})+\varepsilon_{k+1}M_{k+1}(z_{\tau_k}-\hat{z}_{k+1|k})$ when $\varepsilon_k$ is 0 or $\varepsilon_k$ is 1 and the GPS heading angle is updated; and calculate a vehicle sideslip angle according to the vehicle yaw rate obtained by the Kalman filtering algorithm, where $$z_{\tau_k} = [\gamma_{GPS};\ \omega_z^{IMU}],$$

$$M_{k+1} = \eta_1 P_{k+1|k}{}^T H^T (\eta_1 H P_{k+1|k} H^T + \eta_2 R_{k+1} + \eta_3 \delta I)^{-1},$$

$$\begin{cases} \eta_1 = 1 + \tau_1 \\ \eta_2 = 1 + \tau_2 \\ \eta_3 = 1 + \dfrac{1}{\tau_1} + \dfrac{1}{\tau_2} \end{cases},$$

$$\tau_k = \begin{cases} \tau_{k-1}, & \text{if } \varepsilon_k = 1 \\ k, & \text{if } \varepsilon_k = 0 \end{cases},$$

and $K_{k+1} = \dfrac{P_{k+1|k}H'}{HP_{k+1|k}H' + R}$, $\gamma_{GPS}$ is the heading angle measured by GPS, H is an observation matrix, $P_{k+1|k}=AP_kA'+Q$, A is a state-transition matrix, A' is a rank transformation of the state-transition matrix, H' is a rank transformation of the observation matrix, Q is a system noise covariance, $P_k$ is an error covariance, R is an observation noise covariance, I is a unit matrix, $\tau_1$ is a first predefined parameter, and $\tau_2$ is a second predefined parameter.

In some embodiments, the Kalman filtering module specifically includes:

a calculation unit of vehicle yaw angle, configured to calculate a yaw angle of the vehicle according to the vehicle yaw rate; and a calculation unit of vehicle sideslip angle, configured to calculate the vehicle sideslip angle according to $\beta=\psi-\gamma_{GPS}$, where $\psi$ is the vehicle yaw angle, and $\gamma_{GPS}$ is the GPS heading angle.

In some embodiments, the data fusion module specifically includes:

a first vehicle speed determination unit, configured to determine a longitudinal speed and a lateral speed of the vehicle based on a kinematics model of the vehicle and the vehicle yaw rate, a longitudinal acceleration and a lateral acceleration measured by IMU; and record the longitudinal speed and the lateral speed of the vehicle as a first longitudinal speed and a first lateral speed;

a second vehicle speed determination unit, configured to determine a longitudinal speed and a lateral speed of the vehicle based on a vehicle speeds measured by IMU; and record the longitudinal speed and the lateral speed of the vehicle as a second longitudinal speed and a second lateral speed;

a vehicle speed fusion unit, configured to adopt the Kalman filtering algorithm to fuse the first longitudinal speed and the second longitudinal speed, and to fuse the first lateral speed and the second lateral speed; and a calculation unit of vehicle sideslip angle, configured to calculate the vehicle sideslip angle according to the fused longitudinal speed and lateral speed.

In some embodiments, the second vehicle speed determination unit specifically includes:

a vehicle speed determination sub-unit, configured to calculate the longitudinal speed $v_x$ and the lateral speed $v_y$ of the vehicle according to $$\begin{cases} v_{x,k+1} = \cos\beta_k \cdot v_{GPS,k+1} \\ v_{y,k+1} = \sin\beta_k \cdot v_{GPS,k+1} \end{cases},$$

where $v_{GPS}$ is the vehicle speed measured by GPS, $\beta$ is the vehicle sideslip angle, and k is a number of iterations.

In some embodiments, the first vehicle speed determination unit includes: a correction sub-unit of IMU lateral acceleration, configured to correct the lateral acceleration measured by the IMU; where the lateral acceleration adopted for determining the longitudinal speed and the lateral speed of the vehicle is the corrected lateral acceleration.

According to embodiments provided in the present disclosure, the present disclosure discloses the following technical effects:

The method and the system for vehicle sideslip angle estimation based on event-triggered state estimation provided by the present disclosure define an event $\varepsilon_k$, and a meaning of an event triggering is that when a variation of the state variable between adjacent loop iterations in the Kalman filtering algorithm is larger than a preset threshold, the event is considered as triggered. According to the present disclosure, when $\varepsilon_k$ is 0, or when $\varepsilon_k$ is 1 and the GPS heading angle is updated, the state variable is estimated according to $\hat{x}_{k+1}=\hat{x}_{k+1|k}+(1-\varepsilon_{k+1})K_{k+1}(z_{k+1}-\hat{z}_{k+1|k})+\varepsilon_{k+1}M_{k+1}(z_{\tau_k}-\hat{z}_{k+1|k})$, and a vehicle sideslip angle is calculated according to the vehicle yaw rate obtained by adopting the Kalman filtering algorithm. According to the present disclosure, if $\varepsilon_k$ is 1 and the GPS heading angle is not updated yet, the vehicle sideslip angle is estimated by fusing the measurement data of both GPS and IMU. The event-triggered state estimation framework provided by the present disclosure is more stable because it takes the stability of the whole framework into consideration.

BRIEF DESCRIPTION OF THE DRAWINGS

To illustrate embodiments of the present disclosure or technical schemes in the prior art more clearly, accompanying drawings required in the embodiments will be briefly introduced below. Apparently, the drawings in the following description are only some embodiments of the present disclosure, and those of ordinary skills in the art may obtain other drawings according to these drawings without creative work.

DETAILED DESCRIPTION OF THE EMBODIMENTS

Technical schemes in the embodiments of the present disclosure will be described clearly and completely with reference to the accompanying drawings thereof. Apparently, the embodiments described herein are only part of, not all of, embodiments in the present disclosure. Based on the embodiments of the present disclosure, all other embodiments obtained by those of ordinary skills in the art without creative work belong to the scope claimed by the present disclosure.

In order to make the above mentioned purposes, features and advantages of the present disclosure more apparently understood, the present disclosure will be further described with reference to figures and embodiments below.

Embodiment 1

A method for vehicle sideslip angle estimation based on event-triggered state estimation is provided, including:

by setting $z_{k+1}=[\hat{x}_k+\omega_z^{IMU} \cdot T; \omega_z^{IMU}]$ as an observation variable, the Kalman filtering algorithm is used for iteration aiming at estimation of the vehicle yaw rate of the vehicle, where $\omega_z^{IMU}$ is the vehicle yaw rate measured by Inertial Measurement Unit (IMU), T is a sampling cycle, $\hat{x}_k$ is an estimated state variable obtained in the $k^{th}$ iteration of the Kalman filtering algorithm.

In the iteration:

if $(z_k-z_{\tau_{k-1}})^T(z_k-z_{\tau_{k-1}})<\delta$, $\varepsilon_k$ is set to 1, otherwise $\varepsilon_k$ is set to 0; where $\delta$ is a preset threshold value;

if $\varepsilon_k$ is 0, the state variable is estimated according to $\hat{x}_{k+1}=\hat{x}_{k+1|k}+(1-\varepsilon_{k+1})K_{k+1}(z_{k+1}-\hat{z}_{k+1|k})+\varepsilon_{k+1}M_{k+1}(z_{\tau_k}-\hat{z}_{k+1|k})$, and a vehicle sideslip angle is calculated according to the vehicle yaw rate obtained by the Kalman filtering algorithm, where $$z_{\tau_k}=[\gamma_{GPS}; \omega_z^{IMU}],$$

$$M_{k+1}=\eta_1 P_{k+1|k}^T H^T (\eta_1 H P_{k+1|k} H^T+\eta_2 R_{k+1}+\eta_3 \delta I)^{-1},$$

-continued $$\begin{cases} \eta_1=1+\tau_1 \\ \eta_2=1+\tau_2 \\ \eta_3=1+\dfrac{1}{\tau_1}+\dfrac{1}{\tau_2} \end{cases},$$

$$\tau_k=\begin{cases} \tau_{k-1}, & \text{if } \varepsilon_k=1 \\ k, & \text{if } \varepsilon_k=0 \end{cases},$$

and $K_{k+1}=\dfrac{P_{k+1|k}H'}{HP_{k+1|k}H'+R}$, $\gamma_{GPS}$ is a heading angle measured by GPS, H is an observation matrix $P_{k+1|k}=AP_kA'+Q$, A is a state-transition matrix, A' is a rank transformation of the state-transition matrix, H' is a rank transformation of the observation matrix, Q is a system noise covariance, $P_k$ is an error covariance, R is an observation noise covariance, I is a unit matrix, $\tau_1$ is the first predefined parameter, and $\tau_2$ is the second predefined parameter.

When $\varepsilon_k$ is 1, it is determined whether a Global Positioning System (GPS) heading angle is updated; and if the GPS heading angle is updated, the state variable is estimated according to $\hat{x}_{k+1}=\hat{x}_{k+1|k}+(1-\varepsilon_{k+1})K_{k+1}(z_{k+1}-\hat{z}_{k+1|k})+\varepsilon_{k+1}M_{k+1}(z_{\tau_k}-\hat{z}_{k+1|k})$ and the vehicle sideslip angle is calculated according to the vehicle yaw rate obtained by the Kalman filtering algorithm; and if the GPS heading angle is not updated yet, the iteration is terminated, and the vehicle sideslip angle is estimated by fusing measurement data of both GPS and IMU.

The present disclosure defines the event $\varepsilon_k$. If the event is not triggered, the sideslip angle is $\beta=0$; if the event is triggered, it is determined whether the GPS heading angle is updated, and if so, the vehicle sideslip angle is $\beta=\psi-\gamma$. If the GPS heading angle is not updated, the vehicle sideslip angle $\beta$ is calculated according to updated data of the last GPS cycle and a kinematics relation. The meaning of the event triggering is that when the variation of the state variable between adjacent loop iterations in the Kalman filtering algorithm is larger than a preset threshold, the event is considered as triggered. In this embodiment, if $(z_k-Z\tau_{k-1})^T(z_k-z\tau_{k-1})<\delta$, it is considered that the event is triggered, and $\delta$ is a preset threshold.

Figure 1:
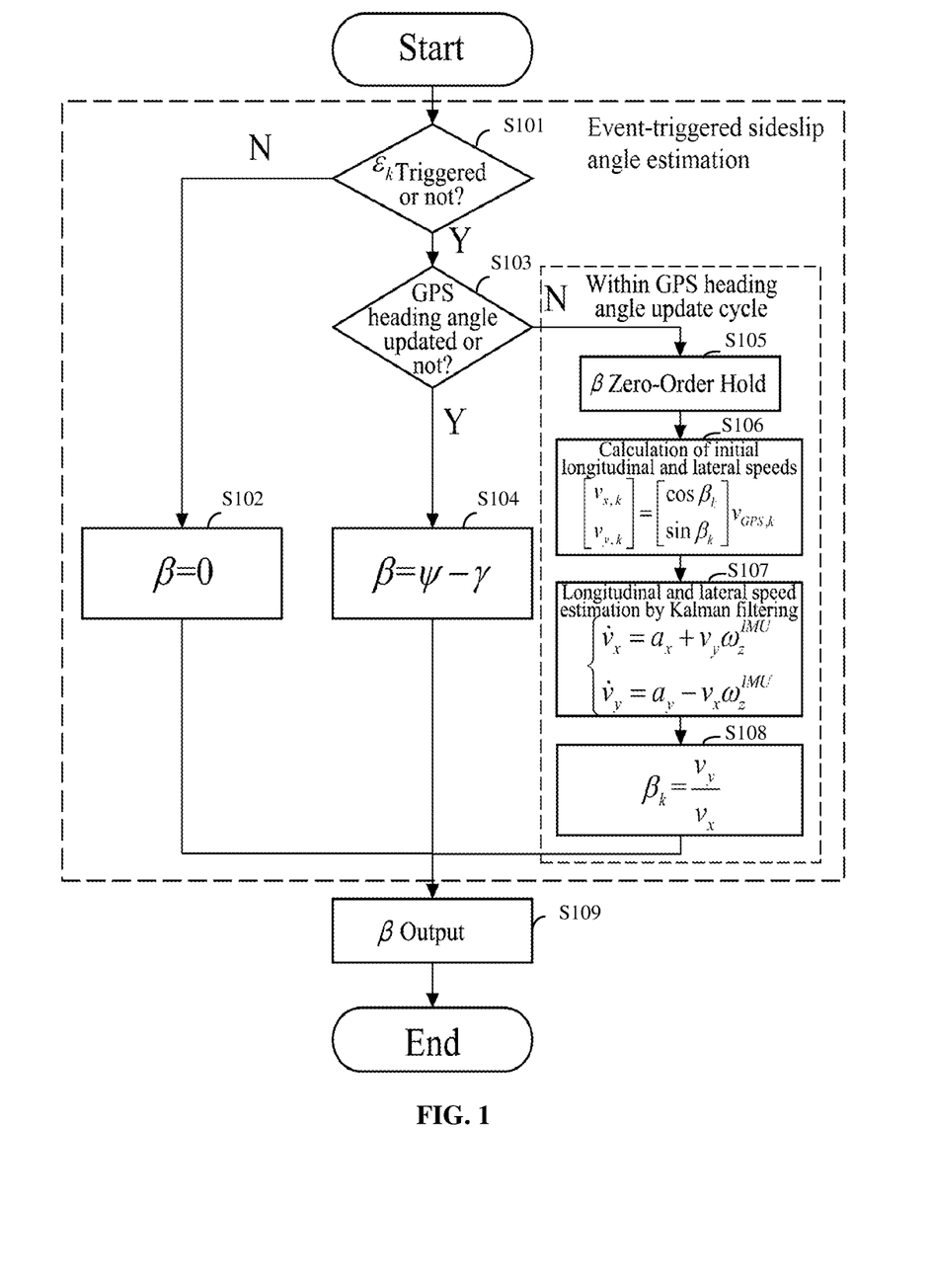
FIG. 1 is a flow chart of a method for vehicle sideslip angle estimation based on event-triggered state estimation provided in Embodiment 1 of the present disclosure.

FIG. 1 shows a specific process of an estimation of the vehicle sideslip angle. The estimation of the vehicle sideslip angle can be realized according to the event-triggered Kalman filter estimation framework, and the specific algorithm works as follows.

A state equation is defined as $$\hat{x}_{k+1|k}=A\hat{x}_k+Bu_k+\omega_k$$

$$\hat{z}_{k+1|k}=H\hat{x}_{k+1|k}+v_k \qquad (1)$$

where, $x_k$ is a state variable and $x_k=[\psi; \omega_z]$; A is the state-transition matrix and A=[1, T;0, 1], T is the sampling cycle; B is the input matrix; $u_k$ is the input variable; $z_{k+1}$ is the observation variable and $z_{k+1}=[\hat{x}_k+\omega_z^{IMU} \cdot T; \omega_z^{IMU}]$;H is the observation matrix and H=[1,1;1,1].

An error covariance matrix between a predicted value and a true value is $$P_{k+1|k}=AP_kA'+Q \qquad (2).$$

The optimal Kalman filtering estimation is $$\hat{x}_{k+1}=\hat{x}_{k+1|k}+K_{k+1}(z_{k+1}-\hat{z}_{k+1|k}) \qquad (3),$$

where, the Kalman gain is $$K_{k+1} = \frac{P_{k+1|k}H'}{HP_{k+1|k}H' + R}. \quad (4)$$

The error covariance matrix between the estimated value and the true value is $$P_{k+1} = (I - K_{k+1}H)P_{k+1|k} \quad (5).$$

The event is defined during the event-triggered state estimation as:

$$\varepsilon_k = \begin{cases} 1, & \text{if } (z_k - z_{\tau_{k-1}})^T(z_k - z_{\tau_{k-1}}) < \delta \\ 0, & \text{otherwise} \end{cases}, \quad (6)$$

where, $\tau_{k-1}$ is the time a sensor signal was transmitted last time.

A measurement time is updated $$\tau_k = \begin{cases} \tau_{k-1}, & \text{if } \varepsilon_k = 1 \\ k, & \text{if } \varepsilon_k = 0 \end{cases}. \quad (7)$$

A measurement value is delivered $$z_{\tau_k} = \varepsilon_k z_k + (1 - \varepsilon_k) Z \tau_{k-1} \quad (8).$$

The event is triggered, so that the Kalman filtering estimation results in:

$$\hat{x}_{k+1} = \hat{x}_{k+1|k} + (1 - \varepsilon_{k+1})K_{k+1}(z_{k+1} - \hat{z}_{k+1|k}) + \varepsilon_{k+1}M_{k+1}(z_{\tau_k} - \hat{z}_{k+1|k}) \quad (9),$$

where, when the event is not triggered (N in S101), the heading angle output by GPS is equivalent to the yaw angle of the vehicle (S102). Gain $M_{k+1}$ of the event-triggered item is:

$$M_{k+1} = \eta_1 P_{k+1|k}{}^T H^T (\eta_1 H P_{k+1|k} H^T + \eta_2 R_{k+1} + \eta_3 \delta I)^{-1} \quad (10),$$

where $\eta_1$, $\eta_2$ and $\eta_3$ are defined as $$\begin{cases} \eta_1 = 1 + \tau_1 \\ \eta_2 = 1 + \tau_2 \\ \eta_3 = 1 + \dfrac{1}{\tau_1} + \dfrac{1}{\tau_2} \end{cases}, \quad (11)$$

where $\tau_1 = 1$ and $\tau_2 = 1$.

Figure 2:
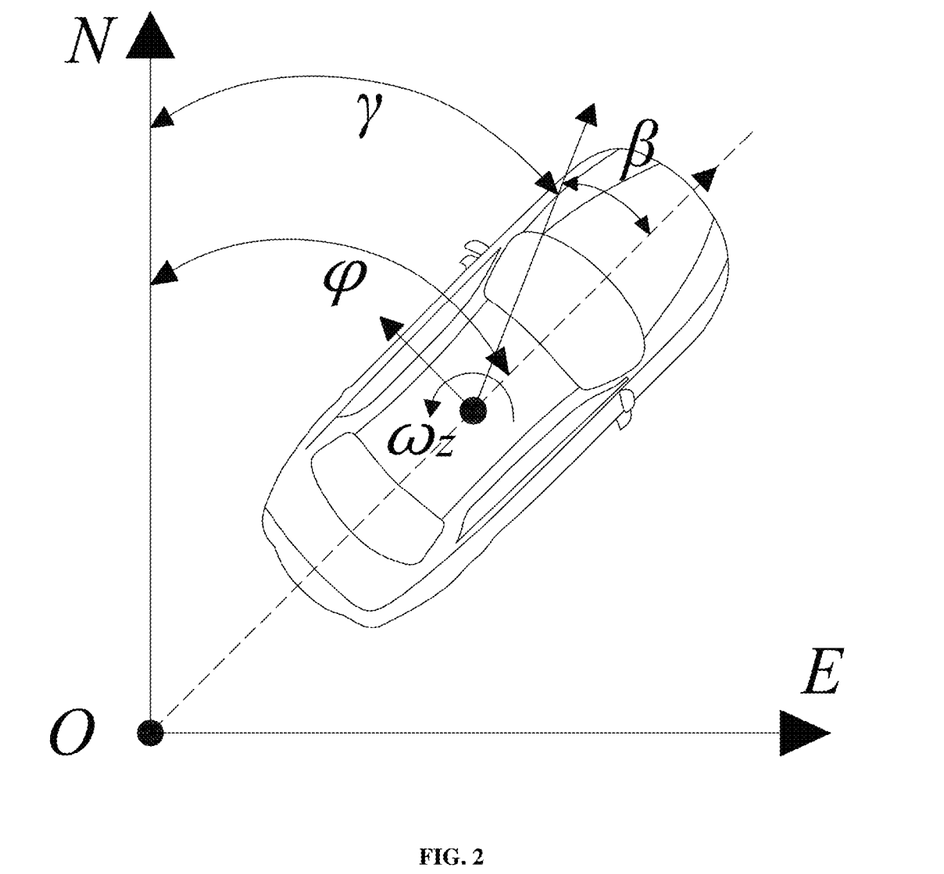
FIG. 2 is a schematic diagram of a relationship between vehicle heading angle, yaw angle, and sideslip angle in accordance with the Embodiment 1 of the present disclosure.

Referring to FIG. 2, the calculated sideslip angle is $$\beta_k = \psi_k - \gamma_k \quad (12).$$

If the event is triggered (Y in S101), it is determined whether the GPS heading angle is updated (S103); and if the GPS heading angle is updated (Y in S103), the result of Kalman filtering estimation is obtained according to Formula (9). At this time, $\varepsilon_k$ in Formula (9) is 1, a value delivered by the observation variable is $z_{\tau_k} = [\gamma_{GPS}; \omega_z^{IMU}]$, and the vehicle sideslip angle is calculated according to Formula (12) (S103). The convergence of Formula (9) ensures the stability of the overall framework of the vehicle sideslip angle estimation method provided by the present disclosure. Formula (9) proves its convergence as follows.

It is considered that when $\varepsilon_k = 1$, Formula (9) can be expressed as $$\hat{x}_{k+1} = \hat{x}_{k+1|k} + M_{k+1}(z_{\tau_k} - z_{k+1}) + M_{k+1}(z_{k+1} - \hat{z}_{k+1|k})$$

$$\tilde{x}_{k+1} = \tilde{x}_{k+1|k} + M_{k+1}(z_{\tau_k} - z_{k+1}) + M_{k+1}(z_{k+1} - \hat{z}_{k+1|k}),$$

where $$z_{k+1} = Hx_{k+1} + v$$

$$\hat{z}_{k+1|k} = H\hat{x}_{k+1|k}$$

and, $$\tilde{x}_{k+1} = \tilde{x}_{k+1|k} + M_{k+1}(z_{\tau_k} - z_{k+1}) + M_{k+1}(H\tilde{x}_{k+1|k} + v)$$

$$\tilde{x}_{k+1} = \Omega_{k+1}\tilde{x}_{k+1|k} - M_{k+1}\rho_{k+1} - M_{k+1}v_{k+1},$$

where $$\Omega_{k+1} = I - M_{k+1}H \text{ and } \rho_{k+1} = z_{\tau_k} - z_{k+1}$$

$$\begin{aligned}
P_{k+1} &= E\{\tilde{x}_{k+1}(\tilde{x}_{k+1})^T\} \\
&= \Omega_{k+1}\tilde{x}_{k+1|k}(\tilde{x}_{k+1|k})^T(\Omega_{k+1})^T - \underbrace{M_{k+1}\rho_{k+1}(\tilde{x}_{k+1|k})^T(\Omega_{k+1})^T}_{\Theta_{k+1}^T} - \\
&\quad \underbrace{M_{k+1}v_{k+1}(\tilde{x}_{k+1|k})^T(\Omega_{k+1})^T}_{\Gamma_{k+1}^T} - \underbrace{\Omega_{k+1}\tilde{x}_{k+1|k}(\rho_{k+1})^T(M_{k+1})^T}_{\Theta_{k+1}} + \\
&\quad M_{k+1}\rho_{k+1}(\rho_{k+1})^T(M_{k+1})^T + \underbrace{M_{k+1}v_{k+1}(\rho_{k+1})^T(M_{k+1})^T}_{o_{k+1}^T} - \\
&\quad \underbrace{\Omega_{k+1}\tilde{x}_{k+1|k}(v_{k+1})^T(M_{k+1})^T}_{\Gamma_{k+1}} + \underbrace{M_{k+1}\rho_{k+1}(v_{k+1})^T(M_{k+1})^T}_{O_{k+1}} + \\
&\quad M_{k+1}v_{k+1}(v_{k+1})^T(M_{k+1})^T \\
&= \Omega_{k+1}P_{k+1|k}(\Omega_{k+1})^T - \Theta_{k+1} - \Theta_{k+1}^T - \Gamma_{k+1} - \Gamma_{k+1}^T + \\
&\quad O_{k+1} + O_{k+1}^T + M_{k+1}\delta(M_{k+1})^T + M_{k+1}R_{k+1}(M_{k+1})^T
\end{aligned}$$

where:

$$\Theta_{k+1} = \Omega_{k+1}\tilde{x}_{k+1|k}(\rho_{k+1})^T(M_{k+1})^T$$

$$\Gamma_{k+1} = \Omega_{k+1}\tilde{x}_{k+1|k}(v_{k+1})^T(M_{k+1})^T, \text{ and}$$

$$O_{k+1} = M_{k+1}\rho_{k+1}(v_{k+1})^T(M_{k+1})^T.$$

according to a lemma $$xy^T + yx^T \leq vxx^T + \sigma^{-1}yy^T$$

$$\begin{aligned}
-\Theta_{k+1} - \Theta_{k+1}^T &\leq \sigma_1 \Omega_{k+1}\tilde{x}_{k+1|k}(\tilde{x}_{k+1|k})^T(\Omega_{k+1})^{T} + \sigma_1^{-1}(-M_{k+1})\rho_{k+1}(\rho_{k+1})^T(-M_{k+1})^T = \sigma_1\Omega_{k+1}P_{k+1|k} \\
&\quad (\Omega_{k+1})^T + \sigma_1^{-1}M_{k+1}\delta(M_{k+1})^T
\end{aligned}$$

$$O_{k+1} + O_{k+1}^T \leq \sigma_2 M_{k+1}v_{k+1}(M_{k+1})^T$$

$$\sigma_2^{-1}M_{k+1}\rho_{k+1}(\rho_{k+1})^T(M_{k+1})^T, \text{ and}$$

$$= \sigma_2 M_{k+1}\rho_{k+1}(M_{k+1})^T + \sigma_2^{-1}M_{k+1}\delta(M_{k+1})^T$$

$$\begin{aligned}
P_{k+1} &\leq \Omega_{k+1}P_{k+1|k}(\Omega_{k+1})^T + \sigma_1\Omega_{k+1}P_{k+1|k} \\
&\quad (\Omega_{k+1})^T + \sigma_1^{-1}M_{k+1}\delta(M_{k+1})^T + \sigma_2 M_{k+1}R_{k+1} \\
&\quad (M_{k+1})^T + \sigma_2^{-1}M_{k+1}\delta(M_{k+1})^T + M_{k+1}\delta(M_{k+1})^T + \\
&\quad M_{k+1}R_{k+1}(M_{k+1})^T
\end{aligned}$$

$$\begin{aligned}
&\leq (1+\sigma_1)\Omega_{k+1}P_{k+1|k}(\Omega_{k+1})^T + (1+\sigma_2)M_{k+1}R_{k+1}(M_{k+1})^T + \\
&\quad (1+\sigma_1^{-1}+\sigma_2^{-1})M_{k+1}\delta(M_{k+1})^T
\end{aligned}$$

$$= \eta_1\Omega_{k+1}P_{k+1|k}(\Omega_{k+1})^T + \eta_2 M_{k+1}R_{k+1}(M_{k+1})^T + \eta_3 M_{k+1}\delta(M_{k+1})^T$$

where:

$$\eta_1 = 1 + \sigma_1$$

$$\eta_2 = 1 + \sigma_2, \text{ and}$$

$$\eta_3 = 1 + \sigma_1^{-1} + \sigma_2^{-1}$$

$$\Xi_{k+1}=P_{k+1|k}-\gamma_{k+1}K_{k+1}P_{z_{k+1}z_{k+1}}(K_{k+1})^T+(1-\gamma_{k+1})\times$$

$$[\eta_1\Omega_{k+1}P_{k+1|k}(\Omega_{k+1})^T+\eta_2M_{k+1}R_{k+1}(M_{k+1})^T+\eta_3M_{k+1}\delta$$
$$(M_{k+1})^T-P_{k+1|k}]$$

Therefore, if $\varepsilon_k=1$, the optimal gain $M_{k+1}$ can be calculated as $$\frac{\partial tr(\overline{P}_{k+1})}{\partial M_{k+1}} = 2\eta_1\left(M_{k+1}HP_{k+1|k}H^T - P_{k+1|k}^T H^T\right) + 2\eta_2 M_{k+1}R_{k+1} + 2\eta_3 M_{k+1}\delta.$$

The event-triggered gain is $$M_{k+1}=\eta_1 P_{k+1|k}{}^T H^T(\eta_1 H_{P_{k+1|k}}H^T+\eta_2 R_{k+1}+\eta_3\delta I)^{-1}.$$

Formula (9)'s convergence has been proved.

If the GPS heading angle is not updated when the event is triggered (N in S103), the sideslip angle β is calculated according to the updated data of the last GPS cycle and the kinematics relation as follows: a zero-order hold (ZOH) is applied with respect to a sideslip angle β that has been previously obtained (S105), the longitudinal speed and the lateral speed of the vehicle are determined based on the vehicle speed measured by GPS (S106) and recorded as the second longitudinal speed and the second lateral speed; by adopting the Kalman filtering algorithm, the first longitudinal speed and the second longitudinal speed are fused, and the first lateral speed and the second lateral speed are fused (S107); the vehicle sideslip angle is calculated according to the longitudinal speed and lateral speed obtained through fusion (S108), specifically as follows.

Due to a low update frequency of GPS module, usually 10-20 Hz, and a high vehicle control period, usually 100 Hz or even 200 Hz, the sideslip angle estimation solely based on the output signal of GPS module cannot satisfy requirements of controlling a whole vehicle. It is proposed that, the update frequency of the vehicle sideslip angle estimation is improved based on a vehicle dynamic method by fusing GPS and IMU.

Figure 3:
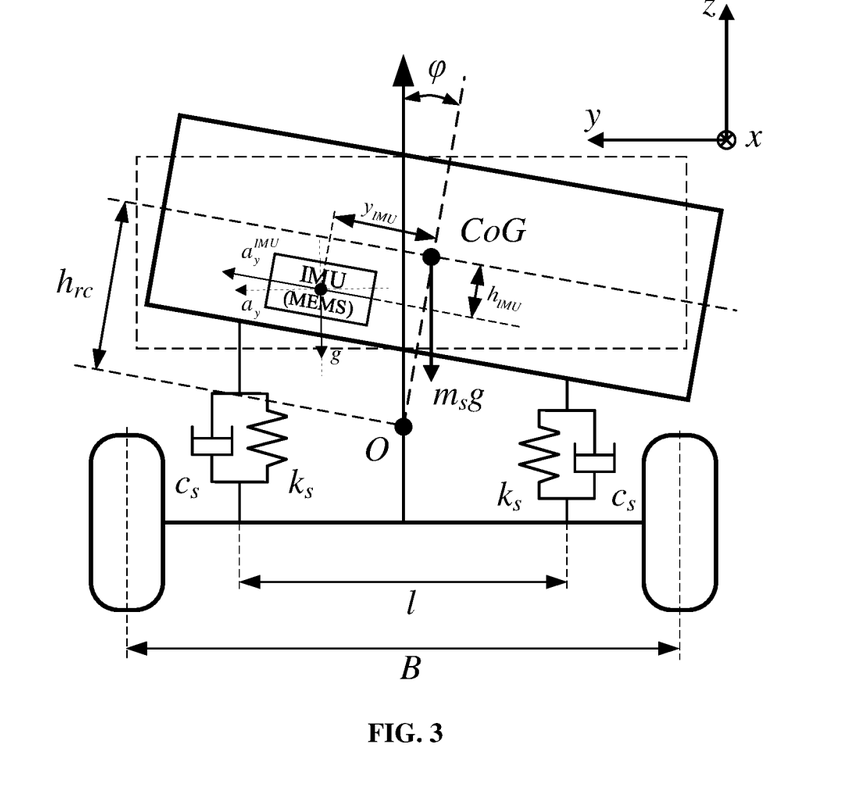
FIG. 3 is a schematic diagram of a vehicle roll dynamics model in accordance with the Embodiment 1 of the present disclosure.

Sensor signal correction is performed based on FIG. 3: since the IMU sensor is not mounted at the centroid of the vehicle, and the IMU sensor is subjected to a comprehensive influence combining the roll and yaw of the vehicle, an output lateral acceleration $\alpha_y$, IMU may not reflect the real lateral acceleration $\alpha_y$ of the vehicle. Therefore, the lateral acceleration output by IMU is corrected as follows:

$$\alpha_{y,IMU}=(\alpha_y+\ddot{\psi}x_{IMU}-\dot{\psi}^2 y_{IMU}+\ddot{\varphi}$$
$$(h_{rc}-h_{IMU})-\dot{\varphi}^2 y_{IMU})\cdot\cos\varphi+g\sin\varphi \qquad (13),$$

where, $\varphi$ is the vehicle roll angle; $\ddot{\psi}$ is the vehicle yaw acceleration; $\dot{\psi}$ is the vehicle yaw rate; $x_{IMU}$ is a longitudinal distance from the sensor mounting position to the centroid; $y_{IMU}$ is a lateral distance from the sensor mounting position to the centroid; $h_{rc}$ is a distance from centroid to the roll center; $h_{IMU}$ is a vertical distance from IMU mounting position to the centroid.

Figure 4:
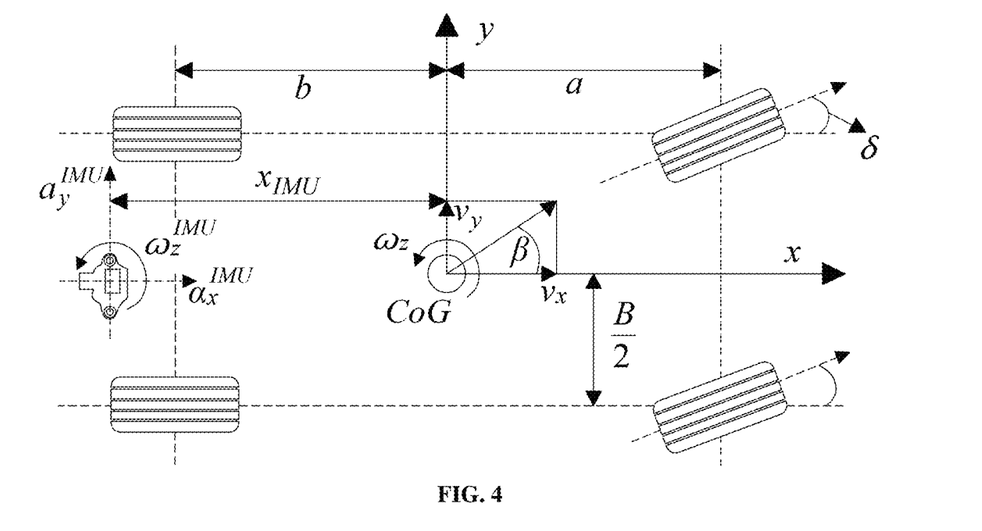
FIG. 4 is a schematic diagram of a vehicle three-degrees-of-freedom model in accordance with the Embodiment 1 of the present disclosure.

Based on the three-degrees-of-freedom vehicle model as shown in FIG. 4, a motion equation of the vehicle is:

$$\begin{cases} \dot{v}_x = a_x + v_y \omega_z^{IMU} \\ \dot{v}_y = a_y - v_x \omega_z^{IMU} \end{cases}. \qquad (14)$$

The above formula is discretized so that $$\begin{bmatrix} v_x \\ v_y \end{bmatrix} = \begin{bmatrix} 1 & \omega_z^{IMU}T \\ -\omega_z^{IMU}T & 1 \end{bmatrix}\begin{bmatrix} v_x \\ v_y \end{bmatrix} + \begin{bmatrix} T & 0 \\ 0 & T \end{bmatrix}\begin{bmatrix} a_x \\ a_y \end{bmatrix}. \qquad (15)$$

In the matrix, T is a system calculation period. The smaller the calculation period is, the higher the prediction model accuracy may be. In consideration of an operation performance of the controller, the calculation period is usually set to 0.01 s.

Given that it is difficult to obtain ideal prediction accuracy by simply using acceleration integration for longitudinal and lateral speeds, a Kalman filtering estimator is introduced to improve the system accuracy.

A state equation is defined as $$\hat{x}_{k+1|k}=A\hat{x}_k+Bu_k+\omega_k \qquad (16)$$

$$\hat{z}_{k+1|k}=H\hat{x}_{k+1|k}+v_k$$

where, $x_k$ is the state variable and $x_k=[v_x;\ v_y]$; A is the state-transition matrix and $A=[1,\ \omega_z^{IMU}T;\ -\omega_z^{IMU}T,\ 1]$, T is the sampling cycle; B is the input matrix; $A=[T;\ T]$, $u_k$ is the input variable; $\hat{z}_{k+1|k}$ is the observation variable and $z_{k+1}=[v_x;\ v_y]$; H is the observation matrix and $H=[1,0;0,1]$.

An error covariance matrix between the predicted value and the true value is $$P_{k+1|k}=AP_k A'+Q \qquad (17).$$

The optimal Kalman filtering estimation is $$\hat{x}_{k+1}=x_{k+1|k}+K_{k+1}(z_{k+1}-\hat{z}_{k+1|k}) \qquad (18),$$

where $z_{k+1}$ is the measured value of the sensor, which is $$z_{k+1} = \begin{bmatrix} v_{x,k+1} \\ v_{y,k+1} \end{bmatrix} = \begin{bmatrix} \cos\beta_k \\ \sin\beta_k \end{bmatrix} v_{GPS,k+1}, \qquad (19)$$

where, $v_{GPS}$ is the vehicle speed output by the GPS module.
Kalman gain is $$K_{k+1} = \frac{P_{k+1|k}H'}{HP_{k+1|k}H' + R}. \qquad (20)$$

The error covariance matrix between the estimated value and the true value is $$P_{k+1}=(I-K_{k+1}H)P_{k+1|k} \qquad (21).$$

The vehicle sideslip angle obtained by a kinematic method is $$\beta_k = \frac{v_y}{v_x}.$$

Then, the obtained vehicle sideslip angle is output (S109).

In the above algorithm, the longitudinal speed and the lateral speed of the vehicle are determined according to the kinematic model. Compared with algorithms relying on the dynamics model in the prior art, the present disclosure does not require many vehicle parameters, thereby providing robustness to a variation of model parameters.

Whether the vehicle is laterally unstable can be determined based on that the estimated vehicle sideslip angle is within a preset range.

If the vehicle is laterally unstable, additional yaw moment of entire vehicle is generated by changing a driving torque or a braking torque of the vehicle, to adjust the vehicle sideslip angle to fall within the preset range, and in turn allow the vehicle to run stably.

In some embodiments, it is also possible to determine whether the vehicle is laterally unstable according to the phase plane method, specifically including the following steps: obtaining motion state of a vehicle under different front wheel steering angles, vehicle speeds and road adhesion coefficients, through a large number of simulation tests; constructing a phase plane of vehicle yaw rate and sideslip angles by using these test data; dividing a stable region of the phase plane as required; determining whether the yaw rate of the vehicle and the vehicle sideslip angle obtained in real time are within the stable region; and determining that the vehicle is laterally unstable if the vehicle yaw rate and the vehicle sideslip angle obtained in real time are within the stable region.

The vehicle sideslip angle estimation method based on event-triggered state estimation provided by the present disclosure has the following advantages.

(1) According to the present disclosure, the vehicle sideslip angle is estimated based on the event-triggered state estimation framework. In consideration of the stability of the entire framework, the present disclosure provides better stability compared with conventional condition-based state estimation without considering the entire framework.

(2) When the GPS signal is updated, the vehicle sideslip angle is estimated based on the updated GPS signal; when the GPS signal is not updated yet, the vehicle sideslip angles for multiple vehicles are estimated based on the IMU signal and the GPS signal updated in the previous cycle. Compared with conventional methods based on dynamics and kinematics and dynamics fusion, this method provides better robustness and higher accuracy to the model parameter variation.

(3) The IMU sensor with a high update frequency and the GPS module with a low update frequency are used for sensor fusion, to obtain the vehicle sideslip angle with a high update frequency, thus meeting the requirements of vehicle stability control.

Embodiment 2

Figure 5:
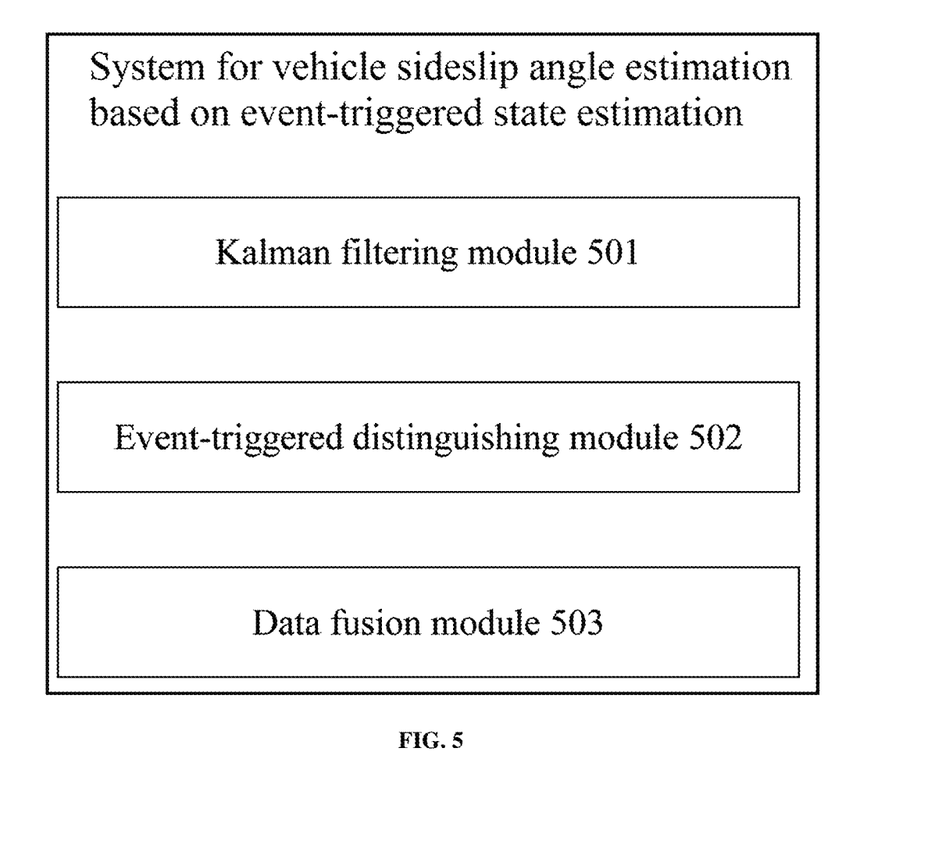
FIG. 5 is a structural diagram of a system for vehicle sideslip angle estimation based on event-triggered state estimation provided in Embodiment 2 of the present disclosure.

Referring to FIG. 5, a system for vehicle sideslip angle estimation based on event-triggered state estimation is provided in the embodiment, including:

a Kalman filtering module 501, configured to set $z_{k+1} = [\hat{x}_k + \omega_z^{IMU} \cdot T; \omega_z^{IMU}]$ as an observation variable, and adopt a Kalman filtering algorithm for iteration aiming at estimation of an vehicle yaw rate, where $\omega_z^{IMU}$ is the vehicle yaw rate measured by Inertial Measurement Unit (IMU), T is a sampling cycle, and $\hat{x}_k$ is an estimated state variable obtained in the $k^{th}$ iteration of the Kalman filtering algorithm;

an event-triggered distinguishing module 502, configured to set $\varepsilon_k$ to 1 if $(z_k - z_{\tau_{k-1}})^T (z_k - z_{\tau_{k-1}}) < \delta$ in an iteration, otherwise set $\varepsilon_k$ to 0; where $\delta$ is a preset threshold value; and a data fusion module 503, configured to estimate the vehicle sideslip angle by fusing measurement data of both a Global Positioning System (GPS) and an IMU when $\varepsilon_k$ is 0 and the GPS heading angle is not updated yet.

The Kalman filtering module 501 is also configured to estimate the state variable according to $\hat{x}_{k+1} = \hat{x}_{k+1|k} + (1-\varepsilon_{k+1})K_{k+1}(z_{k+1}-\hat{z}_{k+1|k}) + \varepsilon_{k+1}M_{k+1}(z_{\tau_k}-\hat{z}_{k+1|k})$, if $\varepsilon_k$ is 0, or $\varepsilon_k$ is 1 and the GPS heading angle is updated; and calculate a vehicle sideslip angle according to the vehicle yaw rate obtained by the Kalman filtering algorithm, where $$z_{\tau_k} = [\gamma_{GPS}; \omega_z^{IMU}],$$

$$M_{k+1} = \eta_1 P_{k+1|k}^T H^T (\eta_1 H P_{k+1|k} H^T + \eta_2 R_{k+1} + \eta_3 \delta I)^{-1},$$

$$\begin{cases} \eta_1 = 1 + \tau_1 \\ \eta_2 = 1 + \tau_2 \\ \eta_3 = 1 + \dfrac{1}{\tau_1} + \dfrac{1}{\tau_2} \end{cases},$$

$$\tau_k = \begin{cases} \tau_{k-1}, & \text{if } \varepsilon_k = 1 \\ k, & \text{if } \varepsilon_k = 0 \end{cases}$$

and $$K_{k+1} = \frac{P_{k+1|k} H'}{H P_{k+1|k} H' + R},$$

$\gamma_{GPS}$ is a heading angle measured by GPS, H is an observation matrix, $P_{k+1|k} = AP_k A' + Q$, A is a state-transition matrix, A' is a rank transformation of the state-transition matrix, H' is a rank transformation of the observation matrix, Q is a system noise covariance, PA is an error covariance, R is an observation noise covariance, I is a unit matrix, $\tau_1$ is the first predefined parameter, and $\tau_2$ is the second predefined parameter.

Among the above modules, the Kalman filtering module 501 includes:

a calculation unit of vehicle yaw angle, configured to calculate a yaw angle of the vehicle according to the vehicle yaw rate; and a calculation unit of vehicle sideslip angle, configured to calculate the vehicle sideslip angle according to $\beta = \psi - \gamma_{GPS}$, where $\psi$ is the vehicle yaw angle, and $\gamma_{GPS}$ is the GPS heading angle.

The data fusion module 503 includes:

a first vehicle speed determination unit, configured to determine a longitudinal speed and a lateral speed of the vehicle based on a kinematics model of the vehicle and the vehicle yaw rate, the longitudinal acceleration and the lateral acceleration measured by IMU; and record the two speeds as a first longitudinal speed and a first lateral speed;

a second vehicle speed determination unit, configured to determine a longitudinal speed and a lateral speed of the vehicle based on a vehicle speeds measured by IMU; and record the two speeds as a second longitudinal speed and a second lateral speed;

a vehicle speed fusion unit, configured to adopt the Kalman filtering algorithm to fuse the first longitudinal speed and the second longitudinal speed, and fuse the first lateral speed and the second lateral speed; and a calculation unit of vehicle sideslip angle, configured to calculate the vehicle sideslip angle according to the longitudinal speed and lateral speed obtained through fusion.

Where, the second vehicle speed determination unit specifically includes:

a vehicle speed determination sub-unit, configured to calculate the longitudinal speed $v_x$ and the lateral speed $v_y$ of the vehicle according to $$\begin{cases} v_{x,k+1} = \cos\beta_k \cdot v_{GPS,k+1} \\ v_{y,k+1} = \sin\beta_k \cdot v_{GPS,k+1} \end{cases},$$

where $v_{GPS}$ is the vehicle speed measured by GPS, $\beta$ is the vehicle sideslip angle, and k is the number of iterations.

The first vehicle speed determination unit includes a correction sub-unit of IMU lateral acceleration, configured to correct the lateral acceleration measured by the IMU; where the lateral acceleration adopted for determining the longitudinal speed and the lateral speed of the vehicle is the corrected lateral acceleration.

In this specification, various embodiments are described in a progressive manner, with each embodiment focusing on its differences from other embodiments, while cross reference would be enough for those same or similar parts between the embodiments. As the system disclosed in the embodiment corresponds to the method disclosed in the embodiment, the description is relatively simple, and the correlated parts can be found in the method description.

Principles and implementation of this present disclosure are described by specific examples, and the explanation of the above embodiments is only used to help understand the method and its core idea of the present disclosure. Also, those of ordinary skills in the art may take some modifications in the specific implementation and application scope according to the idea of the present disclosure. To sum up, the content of this specification should not be construed as limiting the present disclosure.

What is claimed is:

1. A method for vehicle sideslip angle estimation based on event-triggered state estimation, comprising:

setting $z_{k+1}=[\hat{x}_k+\omega_z^{IMU}\cdot T;\ \omega_z^{IMU}]$ as an observation variable, and adopting a Kalman filtering algorithm for iteration aiming at estimation of an estimated vehicle yaw rate, wherein $\omega_z^{IMU}$ is a vehicle yaw rate measured by an Inertial Measurement Unit (IMU), T is a sampling cycle, $\hat{x}_k$ is an estimated state variable obtained in a $k^{th}$ iteration of the Kalman filtering algorithm;

in the iteration:

when $(z_k-z_{\tau_{k-1}})^T(z_k-z_{\tau_{k-1}})<\delta$, $\varepsilon_k$ is set to 1, otherwise $\varepsilon_k$ is set to 0, wherein $\delta$ is a preset threshold value;

when $\varepsilon_k$ is 0, a state variable is estimated according to $\hat{x}_{k+1}=\hat{x}_{k+1|k}+(1-\varepsilon_{k+1})K_{k+1}(z_{k+1}-\hat{z}_{k+1|k})+\varepsilon_{k+1}M_{k+1}\ (z_{\tau_k}-\hat{z}_{k+1|k})$, and a vehicle sideslip angle is calculated according to the estimated vehicle yaw rate obtained by the Kalman filtering algorithm, wherein $z_{\tau_k}=[\gamma_{GPS};\omega_z^{IMU}]$, $M_{k+1}=\eta_1 P_{k+1|k}^T H^T(\eta_1 H P_{k+1|k}H^T+\eta_2 R_{k+1}+\eta_3\delta I)^{-1}$, $\begin{cases}\eta_1=1+\tau_1\\ \eta_2=1+\tau_2\\ \eta_3=1+\dfrac{1}{\tau_1}+\dfrac{1}{\tau_2}\end{cases}$, $\tau_k=\begin{cases}\tau_{k-1},\ \text{if}\ \varepsilon_k=1\\ k,\ \text{if}\ \varepsilon_k=0\end{cases}$ and $K_{k+1}=\dfrac{P_{k+1|k}H'}{HP_{k+1|k}H'+R}$, $\gamma_{GPS}$ is a Global Positioning System (GPS) heading angle that is measured by a GPS, H is an observation matrix $P_{k+1|k}=AP_kA'+Q$, A is a state-transition matrix, A' is a rank transformation of the state-transition matrix, H' is a rank transformation of the observation matrix, Q is a system noise covariance, $P_k$ is an error covariance, R is an observation noise covariance, I is a unit matrix, $\tau_1$ is a first predefined parameter, and $\tau_2$ is a second predefined parameter, wherein $\tau_1=1$ and $\tau_2=1$;

when $\varepsilon_k$ is 1, it is determined whether the GPS heading angle is updated; and when the GPS heading angle is updated, the state variable is estimated according to $\hat{x}_{k+1}=\hat{x}_{k+1|k}+(1-\varepsilon_{k+1})K_{k+1}(z_{k+1}-\hat{z}_{k+1|k})+\varepsilon_{k+1}M_{k+1}\ (z_{\tau_k}-\hat{z}_{k+1|k})$ and the vehicle sideslip angle is calculated according to the estimated vehicle yaw rate obtained by the Kalman filtering algorithm; and when the GPS heading angle is not updated yet, the iteration is terminated, and the vehicle sideslip angle is estimated by fusing measurement data of both the GPS and the IMU;

controlling a vehicle according to the vehicle sideslip angle.

2. The method for vehicle sideslip angle estimation based on event-triggered state estimation according to claim 1, wherein calculation of the vehicle sideslip angle according to the estimated vehicle yaw rate obtained by the Kalman filtering algorithm comprises:

calculating the vehicle yaw angle according to the estimated vehicle yaw rate; and calculating the vehicle sideslip angle according to $\beta=\psi-\gamma_{GPS}$, where $\psi$ is the vehicle yaw angle.

3. The method for vehicle sideslip angle estimation based on event-triggered state estimation according to claim 1, wherein estimation of the vehicle sideslip angle by fusing the measurement data of both the GPS and the IMU comprises:

determining a first longitudinal speed and a first lateral speed of the vehicle based on a kinematics model of the vehicle and the vehicle yaw rate, a longitudinal acceleration and a lateral acceleration measured by the IMU;

determining a second longitudinal speed and a second lateral speed of the vehicle based on a vehicle speed measured by the GPS;

fusing the first longitudinal speed and the second longitudinal speed, and fusing the first lateral speed and the second lateral speed, by the Kalman filtering algorithm; and calculating the vehicle sideslip angle according to fused longitudinal speed and fused lateral speed.

4. The method for vehicle sideslip angle estimation based on event-triggered state estimation according to claim 3, wherein determination of the second longitudinal speed and the second lateral speed of the vehicle based on the vehicle speed measured by the GPS comprises:

calculating the second longitudinal speed $v_x$ and the second lateral speed $v_y$ of the vehicle according to $\begin{cases}v_{x,k+1}=\cos\beta_k\cdot v_{GPS,k+1}\\ v_{y,k+1}=\sin\beta_k\cdot v_{GPS,k+1}\end{cases}$, wherein $v_{GPS}$ is the vehicle speed measured by the GPS, $\beta$ is the vehicle sideslip angle, and k is a number of iterations.

5. The method for vehicle sideslip angle estimation based on event-triggered state estimation according to claim 3, wherein the method further comprises: correcting the lateral acceleration measured by the IMU; wherein, the lateral acceleration adopted when determining the first longitudinal speed and first lateral speed of the vehicle is corrected lateral acceleration.

6. The method for vehicle sideslip angle estimation based on event-triggered state estimation according to claim 1, wherein the controlling a vehicle according to the vehicle sideslip angle comprises:

determining whether the vehicle sideslip angle is within a preset range; and if the vehicle sideslip angle is not within the preset range, generating an additional yaw moment of the vehicle by changing one selected from a group consisting of a driving torque and a braking torque of the vehicle, thereby adjusting the vehicle sideslip angle to fall within the preset range.

7. A system for vehicle sideslip angle estimation based on event-triggered state estimation, comprising:

a Kalman filtering module, configured to set $z_{k+1}=[\hat{x}_k+\omega_z^{IMU}\cdot T; \omega_z^{IMU}]$ as an observation variable, and adopt a Kalman filtering algorithm for iteration aiming at estimation of an estimated vehicle yaw rate, wherein $\omega_z^{IMU}$ is a vehicle yaw rate measured by an Inertial Measurement Unit (IMU), T is a sampling cycle, and $\hat{x}_k$ is an estimated state variable obtained in a $k^{th}$ iteration of the Kalman filtering algorithm;

an event-triggered distinguishing module, configured to set $\varepsilon_k$ to 1 when $(z_k-z_{\tau_{k-1}})^T(z_k-z_{\tau_{k-1}})<\delta$ in the iteration, otherwise set $\varepsilon_k$ to 0; wherein $\delta$ is a preset threshold value; and a data fusion module, configured to estimate a vehicle sideslip angle by fusing measurement data of both a Global Positioning System (GPS) and the IMU when $\varepsilon_k$ is 1 and a GPS heading angle is not updated yet, wherein the Kalman filtering module is also configured to estimate a state variable according to $\hat{x}_{k+1}=\hat{x}_{k+1|k}+(1-\varepsilon_{k+1})K_{k+1}(z_{k+1}-\hat{z}_{k+1|k})+\varepsilon_{k+1}M_{k+1}(z_{\tau_k}-\hat{z}_{k+1|k})$ when $\varepsilon_k$ is 0 or $\varepsilon_k$ is 1 and the GPS heading angle is updated; and calculate the vehicle sideslip angle according to the estimated vehicle yaw rate obtained by the Kalman filtering algorithm, wherein $$z_{\tau_k} = [\gamma_{GPS}; \omega_z^{IMU}],$$

$$M_{k+1} = \eta_1 P_{k+1|k}^T H^T (\eta_1 H P_{k+1|k} H^T + \eta_2 R_{k+1} + \eta_3 \delta I)^{-1},$$

$$\begin{cases} \eta_1 = 1 + \tau_1 \\ \eta_2 = 1 + \tau_2 \\ \eta_3 = 1 + \dfrac{1}{\tau_1} + \dfrac{1}{\tau_2} \end{cases},$$

$$\tau_k = \begin{cases} \tau_{k-1}, & \text{if } \varepsilon_k = 1 \\ k, & \text{if } \varepsilon_k = 0 \end{cases}$$

and $$K_{k+1} = \frac{P_{k+1|k} H'}{H P_{k+1|k} H' + R},$$

$\gamma_{GPS}$ is the GPS heading angle that is measured by the GPS, H is an observation matrix $P_{k+1|k}=AP_kA'+Q$, A is a state-transition matrix, A' is a rank transformation of the state-transition matrix, H' is a rank transformation of the observation matrix, Q is a system noise covariance, $P_k$ is an error covariance, R is an observation noise covariance, I is a unit matrix, $\tau_1$ is a first predefined parameter, and $\tau_2$ is a second predefined parameter; wherein $\tau_1=1$ and $\tau_2=1$;

the system for vehicle sideslip angle estimation further comprises an output module, configured to output the vehicle sideslip angle, so that a vehicle is controlled according to the vehicle sideslip angle.

8. The system for vehicle sideslip angle estimation based on event triggered state estimation according to claim 7, wherein the Kalman filtering module comprises:

a calculation unit of vehicle yaw angle, configured to calculate a yaw angle of the vehicle according to the estimated vehicle yaw rate; and a calculation unit of vehicle sideslip angle, configured to calculate the vehicle sideslip angle according to $\beta=\psi-\gamma_{GPS}$, where $\psi$ is the vehicle yaw angle.

9. The system for vehicle sideslip angle estimation based on event triggered state estimation according to claim 7, wherein the data fusion module comprises:

a first vehicle speed determination unit, configured to determine a first longitudinal speed and a first lateral speed of the vehicle based on a kinematics model of the vehicle and the vehicle yaw rate, a longitudinal acceleration and a lateral acceleration measured by IMU;

a second vehicle speed determination unit, configured to determine a second longitudinal speed and a second lateral speed of the vehicle based on a vehicle speed measured by IMU;

a vehicle speed fusion unit, configured to adopt the Kalman filtering algorithm to fuse the first longitudinal speed and the second longitudinal speed, and to fuse the first lateral speed and the second lateral speed; and a calculation unit of vehicle sideslip angle, configured to calculate the vehicle sideslip angle according to fused longitudinal speed and fused lateral speed.

10. The system for vehicle sideslip angle estimation based on event triggered state estimation according to claim 9, wherein the second vehicle speed determination unit comprises:

a vehicle speed determination sub-unit, configured to calculate the second longitudinal speed $v_x$ and the second lateral speed $v_y$ of the vehicle according to $$\begin{cases} v_{x,k+1} = \cos\beta_k \cdot v_{GPS,k+1} \\ v_{y,k+1} = \sin\beta_k \cdot v_{GPS,k+1} \end{cases},$$

wherein $v_{GPS}$ is the vehicle speed measured by the GPS, $\beta$ is the vehicle sideslip angle, and k is a number of iterations.

11. The system for vehicle sideslip angle estimation based on event triggered state estimation according to claim 9, wherein the first vehicle speed determination unit comprises: a correction sub-unit of IMU lateral acceleration, configured to correct the lateral acceleration measured by the IMU; wherein the lateral acceleration adopted for determining the first longitudinal speed and the first lateral speed of the vehicle is corrected lateral acceleration.

12. The system for vehicle sideslip angle estimation based on event triggered state estimation according to claim 7, wherein the control a vehicle according to the vehicle sideslip angle comprises:

determine whether the vehicle sideslip angle is in a preset threshold; and if the vehicle sideslip angle is not within the preset range, generate an additional yaw moment of the vehicle by changing one selected from a group consisting of a driving torque and a braking torque of the vehicle, thereby adjusting the vehicle sideslip angle to fall within the preset range.

* * * * *